(12) United States Patent
Ren et al.

(10) Patent No.: US 12,146,248 B2
(45) Date of Patent: Nov. 19, 2024

(54) FLAME-RETARDANT NON-WOVEN FIBROUS WEBS

(71) Applicant: 3M INNOVATIVE PROPERTIES COMPANY, St. Paul, MN (US)

(72) Inventors: Liyun Ren, Woodbury, MN (US); Daniel J. Zillig, Woodbury, MN (US); Sachin Talwar, Woodbury, MN (US); Eumi Pyun, St. Paul, MN (US); Jeffrey A. Chambers, St. Paul, MN (US); Nurkan Turkdogru Gurun, Indianapolis, MN (US); Pingfan Wu, Woodbury, MN (US); Tien T. Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 42 days.

(21) Appl. No.: 17/261,661

(22) PCT Filed: Oct. 15, 2019

(86) PCT No.: PCT/IB2019/058779
§ 371 (c)(1),
(2) Date: Jan. 20, 2021

(87) PCT Pub. No.: WO2020/079588
PCT Pub. Date: Apr. 23, 2020

(65) Prior Publication Data
US 2021/0292947 A1    Sep. 23, 2021

Related U.S. Application Data

(60) Provisional application No. 62/746,386, filed on Oct. 16, 2018.

(51) Int. Cl.
*D04H 1/56* (2006.01)
*D01F 1/07* (2006.01)
(Continued)

(52) U.S. Cl.
CPC .............. *D04H 1/56* (2013.01); *D01F 1/07* (2013.01); *D01F 6/84* (2013.01); *D04H 3/16* (2013.01); *D10B 2401/041* (2013.01)

(58) Field of Classification Search
None
See application file for complete search history.

(56) References Cited

U.S. PATENT DOCUMENTS 3,987,008 A * 10/1976 Stackman ............... C08L 67/02
                                                          525/437
4,118,531 A   10/1978 Hauser
(Continued)

FOREIGN PATENT DOCUMENTS

| CN | 100540606 | 9/2009 |
| CN | 201698809 | 1/2011 |

(Continued)

OTHER PUBLICATIONS

Machine Translation of JP20170160548 (Year: 2017).*
International Search Report for PCT International Application No. PCT/IB2019/058779, mailed on Jan. 7, 2020, 6 pages.

*Primary Examiner* — Shawn McKinnon
(74) *Attorney, Agent, or Firm* — Philip P. Soo

(57) ABSTRACT

Provided are non-woven fibrous webs, methods and assemblies thereof. The non-woven fibrous web comprises a plurality of melt-blown fibers. The plurality of melt-blown fibers include a thermoplastic polymer blended with a phosphinate and/or polymeric phosphonate. The provided non-woven articles can afford a fine fiber diameter for enhanced acoustic insulation properties, dimensional stability, and superior flame-retardant properties when compared with conventional non-woven articles having similar fiber diameters.

19 Claims, 1 Drawing Sheet

(51) Int. Cl.
*D01F 6/84* (2006.01)
*D04H 3/16* (2006.01)

(56) References Cited

U.S. PATENT DOCUMENTS

| | | | |
|---|---|---|---|
| 4,719,279 A | 1/1988 | Kauth | |
| 4,770,493 A | 9/1988 | Ara | |
| 4,780,359 A | 10/1988 | Trask | |
| 4,879,168 A | 11/1989 | McCullough | |
| 5,298,694 A | 3/1994 | Thompson | |
| 5,560,990 A | 10/1996 | Ilg | |
| 5,773,375 A | 6/1998 | Swan | |
| 5,961,905 A | 10/1999 | Stanley | |
| 6,051,103 A | 4/2000 | Aikawa | |
| 6,228,467 B1 | 5/2001 | Taniguchi | |
| 6,256,600 B1 | 7/2001 | Bolton | |
| 6,309,987 B1 | 10/2001 | Srinivasan | |
| 6,861,499 B2 | 3/2005 | Vinciguerra | |
| 7,279,440 B2 | 10/2007 | Berrigan | |
| 7,476,632 B2 | 1/2009 | Olson | |
| 7,757,811 B2 | 7/2010 | Fox | |
| 7,816,287 B1 | 10/2010 | Hartgrove | |
| 8,268,738 B2 | 9/2012 | Mceneany | |
| 9,181,638 B2 | 11/2015 | Kwak | |
| 9,194,065 B2 | 11/2015 | Moore | |
| 9,416,485 B2 | 8/2016 | Moore | |
| 9,695,278 B2 | 7/2017 | Kagumba | |
| 2003/0232555 A1 | 12/2003 | Nobuto | |
| 2006/0020064 A1* | 1/2006 | Bauer | C08K 5/5313 524/115 |
| 2006/0116043 A1 | 6/2006 | Hope | |
| 2006/0194893 A1 | 8/2006 | Prybutok | |
| 2007/0004307 A1 | 1/2007 | Wyss | |
| 2008/0038976 A1 | 2/2008 | Berrigan | |
| 2008/0249221 A1* | 10/2008 | Corkery | C09J 11/04 524/404 |
| 2009/0209158 A1 | 8/2009 | Richeson | |
| 2012/0121843 A1 | 5/2012 | Lebel | |
| 2014/0000751 A1* | 1/2014 | Kagumba | C08G 63/6926 525/437 |
| 2015/0017856 A1 | 1/2015 | Davis | |
| 2015/0087756 A1 | 3/2015 | Qi | |
| 2015/0105484 A1* | 4/2015 | Sun | C08K 5/34922 524/133 |
| 2015/0125696 A1 | 5/2015 | Fedorova | |
| 2015/0140306 A1 | 5/2015 | Endo | |
| 2016/0298266 A1 | 10/2016 | Zillig | |
| 2017/0190876 A1* | 7/2017 | Kagumba | C08K 5/524 |

FOREIGN PATENT DOCUMENTS

| | | | |
|---|---|---|---|
| CN | 202264458 | | 6/2012 |
| CN | 102926202 | | 2/2013 |
| CN | 103113775 | | 5/2013 |
| CN | 103146175 | | 2/2015 |
| CN | 104672798 | | 6/2015 |
| CN | 104845094 | | 8/2015 |
| CN | 104846477 | | 8/2015 |
| JP | 20170160548 | * | 9/2017 |
| WO | WO 2008-061075 | | 5/2008 |
| WO | WO 2009-049205 | | 4/2009 |
| WO | WO 2011-028675 | | 3/2011 |
| WO | WO 2013-096529 | | 6/2013 |
| WO | WO 2015-080913 | | 6/2015 |
| WO | WO 2018-093624 | | 5/2018 |
| WO | WO 2018-126085 | | 7/2018 |
| WO | WO 2019-027866 | | 2/2019 |
| WO | WO 2019-090659 | | 5/2019 |

* cited by examiner

FLAME-RETARDANT NON-WOVEN FIBROUS WEBS

CROSS REFERENCE TO RELATED APPLICATIONS

This application is a national stage filing under 35 U.S.C. 371 of PCT/IB2019/058779, filed Oct. 15, 2019, which claims the benefit of U.S. Provisional Patent Application No. 62/746,386, filed Oct. 16, 2018, the disclosures of which are incorporated by reference in their entirety herein.

FIELD OF THE INVENTION

Provided are non-woven fibrous webs and related articles and assemblies including melt-blown fibers, and methods for preparing and using such fibrous webs, articles, and assemblies. The non-woven fibrous webs can be used in thermal and acoustic applications.

BACKGROUND

Non-woven articles capable of resisting high temperatures are of great interest in the aerospace, automotive, construction, transportation and electronics industries. High temperature resistant materials can be made from glass fibers, basalt fibers, and polyimide fibers. Such fibers can be formed into a non-woven web structure with a binder to provide structural integrity. Melamine foam, polyimide foam, and aramid felt materials are also known flame-retardant insulation materials.

While these materials are flame-retardant to varying degrees, these materials are generally unable to provide a combination of high surface area and high porosity achieved by webs based on melt-blown fibers. Melt blowing is a manufacturing technology capable of making fibers with diameters of less than 10 micrometers, many times finer than a human hair. Fine fibers can help achieve high performance properties in many thermal, acoustic, absorbent, and filtration applications.

The flammability of polymers that can be used in a melt blowing process also presents a significant technical challenge. Many polymeric materials are inherently flammable, and fine fibers of even less flammable polymers can be prone to burning. High temperature polymers such as polyethylene terephthalate, known for having good thermal stability, chemical resistance, and excellent mechanical properties, can be precluded from use in many applications subjected to regulated flammability standards.

Yet another technical problem faced by conventional melt-blown nonwoven fibrous webs is a tendency to shrink when heated to even moderate temperatures in subsequent processing or use, such as use as a thermal insulation material. Shrinkage may be particularly problematic when the melt-blown fibers include a thermoplastic polyester—for example polyethylene terephthalate, polylactic acid, polyethylene naphthalate, or combinations thereof, which may be otherwise desirable in a given application for its high temperature performance.

SUMMARY

Improvement of flame retardancy in polymeric fibers through the use of flame-retardant additives has been reported in the literature. The halogen-containing flame-retardants are well known and play an important role due to their high efficiency while added into polymeric materials. The toxicity and corrosiveness of these flame-retardants, however, have raised environmental concerns and use of these materials have been thus been restricted in many countries.

As a result, phosphorus-containing compounds have been of interest as flame-retardants, and especially organophosphorus compounds. Some of these compounds have proven effectiveness as flame-retardants, and are largely free from issues of smoke, toxicity and corrosion. However, it is remains a challenge to make flame-retardant melt-blown non-woven articles because of poor compatibility between the melt blown polymer and flame-retardant, which tends to increase significantly the median fiber diameter of melt-blown materials.

Disclosed herein are thermoplastic polymer, non-woven fibrous webs made from a melt blowing microfiber fabrication process incorporating a polymeric phosphorus-based additive. The provided non-woven fibrous webs can be dimensionally stable at elevated temperatures, have very fine fibers for superior acoustic and thermal insulation properties, and display flame-retardant properties.

The product prepared by the method can have a high flame-retardant performance and can make flame-retardant ultra-fine non-woven fibrous webs with the flame-retardant property of 94ULV-0 level, VTM-0 level and FAR25-856(a) level. Some non-woven materials demonstrated superior flame-resistant barrier properties as well as reduction of fiber diameter as compared with other flame-retardant additive thermoplastic polymer webs.

In a first aspect, a non-woven fibrous web is provided. The non-woven fibrous web comprises: a plurality of melt-blown fibers comprising a thermoplastic polymer blended with a phosphinate and/or polymeric phosphonate, wherein the nonwoven fibrous structure exhibits a Shrinkage of less than 15% after being heated to 150° C. for 60 minutes.

In a second aspect, a non-woven fibrous web is provided, comprising: a plurality of melt-blown fibers comprising a thermoplastic polymer blended with a phosphinate and/or polymeric phosphonate, wherein the thermoplastic polymer is substantially free of any nucleating agent in an amount effective to achieve nucleation.

In a third aspect, a non-woven fibrous assembly is provided comprising: the non-woven fibrous web having opposed first and second major surfaces; and an adhesive layer disposed on one or both of the first and second major surfaces, and optionally, an outer layer disposed on the adhesive layer that is flame-retardant.

In a fourth aspect, a method of making a non-woven fibrous web is provided, comprising: mixing a thermoplastic polymer with a phosphinate and/or polymeric phosphonate to obtain a polymeric blend; forming a plurality of melt-blown fibers by passing a molten stream of the polymeric blend through a plurality of orifices of a melt-blowing die; and collecting at least some of the melt-blown fibers on a collector to obtain the non-woven fibrous web.

In some exemplary embodiments, the process includes forming a multiplicity of melt-blown fibers by passing a molten polymer stream through a multiplicity of orifices of a melt-blowing die, subjecting at least a portion of the melt-blown fibers to a controlled in-flight heat treatment operation immediately upon exit of the melt-blown fibers from the multiplicity of orifices, wherein the controlled in-flight heat treatment operation takes place at a temperature below a melting temperature of the portion of the melt-blown fibers for a time sufficient to achieve stress relaxation of at least a portion of the molecules within the portion of the fibers subjected to the controlled in-flight heat treatment operation, and collecting at least some of the portion of the melt-blown fibers subjected to the controlled in-flight heat treatment operation on a collector to form a non-woven fibrous structure. The nonwoven fibrous structure can exhibit a Shrinkage (as determined using the methodology described herein) less than a Shrinkage measured on an identically-prepared structure that is not subjected to the controlled in-flight heat treatment operation.

Figure 1:
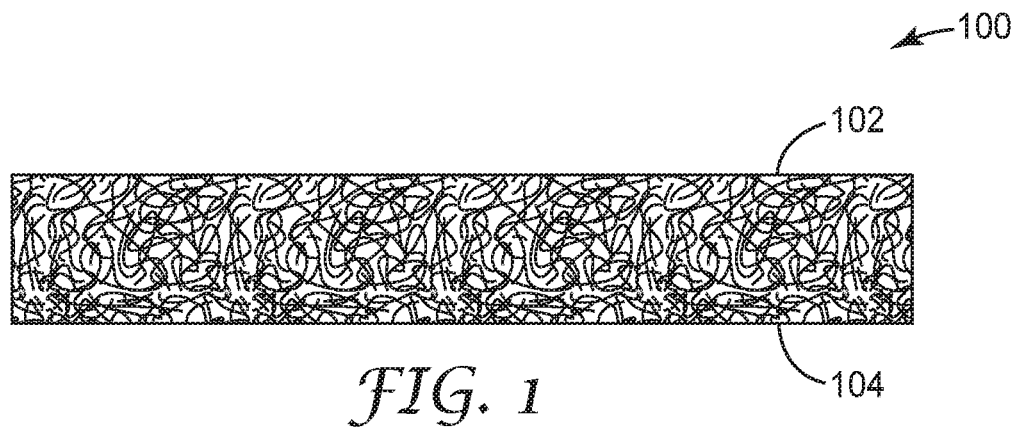
FIG. 1 is a side, cross-sectional view of a non-woven fibrous web according to one embodiment.

Repeated use of reference characters in the specification and drawings is intended to represent the same or analogous features or elements of the disclosure. It is to be understood that numerous other modifications and embodiments can be devised by those skilled in the art, which fall within the scope and spirit of the principles of the disclosure. The figures may not be drawn to scale.

Definitions

"Ambient conditions" means at 25° C. and 101.3 kPa (1 atm) pressure.

"Ambient temperature" means at 25° C.

"Basis weight" is calculated as the weight of a 10 cm×10 cm web sample multiplied by 100, and is expressed in grams per square meter (gsm).

"Bulk density" is the mass per unit volume of a non-woven fibrous web.

"Copolymer" refers to polymers made from repeat units of two or more different polymers and includes random, block and star (e.g. dendritic) copolymers.

"Dimensionally stable" refers to a structure that resists shrinkage when subjected to elevated temperatures for a given period of time, where elevated temperatures can be temperatures exceeding 80° C., 85, 90, 95, 100, 105, 110, 115, 120, 125, 130, 135, 140, 145, or 150° C.

"Die" means a processing assembly including at least one orifice for use in polymer melt processing and fiber extrusion processes, including but not limited to melt-blowing.

"Discontinuous" when used with respect to a fiber or plurality of fibers means fibers having a limited aspect ratio (e.g., a ratio of length to diameter of e.g., less than 10,000).

"Glass transition temperature" of a polymer refers to a temperature at which there is a reversible transition in an amorphous polymer (or in an amorphous region within a semi crystalline polymer) from a hard and relatively brittle "glassy" state into a viscous or rubbery state as the temperature is increased.

"Median fiber diameter" of fibers in a non-woven fibrous web is determined by producing one or more images of the fiber structure, such as by using a scanning electron microscope; measuring the transverse dimension of clearly visible fibers in the one or more images resulting in a total number of fiber diameters; and calculating the median fiber diameter based on that total number of fiber diameters.

"Melting temperature" for a polymer represents the temperature at which a polymer changes state from a solid to a liquid, and can be determined as the peak maximum of a first-heat total-heat flow plot obtained using modulated differential scanning calorimetry, occurring in the melting region of the polymer or fiber if there is only one maximum in the melting region; and, if there is more than one maximum indicating more than one melting point (e.g., because of the presence of two distinct crystalline phases), as the temperature corresponding to the highest-amplitude melting peak.

"Non-woven fibrous web" means a plurality of fibers characterized by entanglement or inter-fiber bonding of the fibers to form a sheet or mat exhibiting a structure of individual fibers or filaments which are interlaid, but not in an identifiable manner as in a knitted fabric.

"Oriented" when used with respect to a fiber means that at least portions of the polymer molecules within the fibers are aligned with the longitudinal axis of the fibers, for example, by use of a drawing process or attenuator upon a stream of fibers exiting from a die.

"Shrinkage" means reduction in the dimension of a fibrous non-woven web after being heated to 150° C. for a pre-determined amount of time, according to the test method described in U.S. Patent Publication No. 2016/0298266 (Zillig et al.);

"Substantially" means a majority of, or mostly, as in an amount of at least 50%, 60, 70, 80, 90, 95, 96, 97, 98, 99, 99.5, 99.9, 99.99, or 99.999%, or 100%.

DETAILED DESCRIPTION

Objects and advantages of this disclosure are further illustrated by the following non-limiting examples, but materials and amounts thereof recited in these examples, as well as other conditions and details, should not be construed to unduly limit this disclosure. Herein, the terms "a", "an", and "the" include plural referents unless the content clearly indicates otherwise. The conjunction "or" is generally employed in its sense including "and/or" unless it is clearly indicated otherwise.

Described herein are non-woven fibrous webs, articles and assemblies thereof, and methods thereof that may be suitable for thermal and acoustic insulation. Further applications for these materials include filtration media, surgical drapes, and wipes, liquid and gas filters, garments, blankets, furniture, transportation (e.g., for aircraft, rotorcraft, trains, and automotive vehicles), upholstery, and personal protection equipment.

Non-Woven Fibrous Webs

The non-woven fibrous webs of the present disclosure contain primary fibers directly formed from at least one thermoplastic polymer. The directly formed fibers generally have at least 35% by weight of one or more thermoplastic polymers. In various embodiments, the amount of thermoplastic polymer in the fibers may be less than, equal to, or greater than 35, 40, 45, 50, 55, 60, 65, 70, 75, 80, 85, 90, 95, or 99% by weight relative to the overall weight of the primary fibers.

Exemplary thermoplastic polymers include polyolefins such as polypropylene and polyethylene, polyesters such as polyethylene terephthalate and polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefins, along with copolymers and blends thereof.

In some embodiments, one or more of the thermoplastic polymers are amorphous—that is, the polymer has essentially zero crystallinity. Optionally, some or all of the fibers in the provided non-woven fibrous web are made exclusively from thermoplastic polymers that are amorphous. Amorphous thermoplastic polymers include polycarbonate, polystyrene, polyetherimide, polyethylene terephthalate glycol, acrylonitrile butadiene styrene copolymer, ethylene butylene styrene copolymer, and cyclic olefins, along with copolymers and blends thereof.

In some embodiments, the at least one thermoplastic polymer includes a semi-crystalline polymer. Semi-crystalline polymers include aliphatic polymers and aromatic polymers.

In some embodiments, the semi-crystalline polymer includes an aromatic polyester. In certain exemplary embodiments, the aromatic polyester includes polyethylene terephthalate, polyethylene terephthalate glycol, polybutylene terephthalate, polytrimethylene terephthalate, polyethylene napthalate, liquid crystal polyester, or a copolymer or blend thereof. The thermoplastic semi-crystalline polymer can include a blend of a polyester and at least one other polymer.

In other embodiments, the semi-crystalline polymer includes an aliphatic polyester. Useful aliphatic polyesters include homo- and copolymers of poly(hydroxyalkanoates) and homo- and copolymers of those aliphatic polyesters derived from the reaction product of one or more polyols with one or more polycarboxylic acids formed from the reaction product of one or more alkanediols with one or more alkanedicarboxylic acids (or acyl derivatives). Polyesters may be derived from multifunctional polyols, e.g. glycerin, sorbitol, pentaerythritol, and combinations thereof, to form branched, star, and graft homo- and copolymers. Miscible and immiscible blends of aliphatic polyesters with one or more additional semicrystalline or amorphous polymers may also be used.

Exemplary aliphatic polyesters that are also semi-crystalline include polylactic acid, polyglycolic acid, poly(lactic-co-glycolic acid), polybutylene succinate, polyhydroxybutyrate, polycaprolactone, polyhydroxyvalerate, polyhydroxyalkanoates, polyglycolide, polybutylene succinate, poly(3-hydroxybutyrate-co-3-hydroxyvalerate) and polyethylene adipate, and blends and copolymers thereof.

Polyhydroxyalkanoates are derived by condensation or ring-opening polymerization of hydroxy acids, or derivatives thereof. Polyhydroxyalkanoates can be represented by the formula:

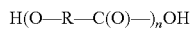

where R is an alkylene moiety that may be linear or branched having 1 to 20 carbon atoms, preferably 1 to 12 carbon atoms optionally substituted by catenary (bonded to carbon atoms in a carbon chain) oxygen atoms; n is a number such that the ester is polymeric, and is preferably a number such that the molecular weight of the aliphatic polyester is at least 10,000, preferably at least 30,000, and most preferably at least 50,000 g/mol. R may further comprise one or more in-chain ether oxygen atoms. Generally, the R group of the hydroxy acid is such that the pendant hydroxyl group is a primary or secondary hydroxyl group.

The thermoplastic polymer preferably has an intrinsic viscosity (IV) suitable for preparation of fine fibers in a melt blowing process. The intrinsic viscosity of a given polymer is defined as the limiting value of the reduced viscosity, or inherent viscosity, at infinite dilution of the polymer. This parameter can be correlated with the melting point, crystallinity and tensile strength of the polymer. Various methods can be used to determine intrinsic viscosity. For example, intrinsic viscosity can be measured using a Ubbelohde viscometer or obtained by measuring melt flow index of the polymer using an extrusion plastometer and correlating the melt flow index to intrinsic viscosity based on internal calibration curves of the equipment. Intrinsic viscosity can be in the range of from 0.4 to 0.7, from 0.4 to 0.6, from 0.4 to 0.5, or in some embodiments, less than, equal to, or greater than 0.4, 0.42, 0.45, 0.47, 0.5, 0.52, 0.55, 0.57, 0.6, 0.62, 0.65, 0.67, or 0.7.

Additional details on thermoplastic polymers useful for making non-woven fibrous webs can be found in, for example, U.S. Pat. No. 7,757,811 (Fox et al.) and U.S. Pat. No. 9,194,065 (Moore et al.).

High molecular weight polymers can provide fibers with good mechanical properties, but such polymers also tend to have high melt viscosities, which can complicate processing. Molecular weights for useful aliphatic polyester can be in the range of from 15,000 g/mol to 6,000,000 g/mol, from 20,000 g/mol to 2,000,000 g/mol, from 40,000 g/mol to 1,000,000 g/mol, or in some embodiments, less than, equal to, or greater than 15,000 g/mol; 20,000; 25,000; 30,000; 35,000; 40,000; 45,000; 50,000; 60,000; 70,000; 80,000; 90,000; 100,000; 200,000; 500,000; 700,000; 1,000,000; 2,000,000; 3,000,000; 4,000,000; 5,000,000; or 6,000,000 g/mol.

The median fiber diameter of the plurality of melt-blown fibers in the non-woven fibrous web can be engineered to provide properties desired in the end application. For acoustic absorbers, for example, it can be desirable for the median fiber diameter to be as small as possible to obtain the greatest surface area per unit volume. The minimum fiber diameters achievable are at least partially dependent on the melt viscosities of the polymers used to form the fibers.

In the provided webs, these fibers can have a median diameter of from 0.2 micrometers to 20 micrometers, from 0.5 micrometers to 15 micrometers, from 1 micrometers to 10 micrometers, or in some embodiments, less than, equal to, or greater than 0.2 micrometers, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, or 20 micrometers.

Based on the nature of the thermoplastic polymers used to form the primary fibers, manufacturing process, and presence of melt additives and secondary fibers, the provided non-woven fibrous webs can have a wide range of bulk densities. The provided webs can display a bulk density of from 1 kg/m$^3$ to 1000 kg/m$^3$, 1 kg/m$^3$ to 100 kg/m$^3$, 1 kg/m$^3$ to 50 kg/m$^3$, or in some embodiments, less than, equal to, or greater than 1 kg/m$^3$, 2, 3, 4, 5, 6, 7, 8, 9, 10, 12, 15, 17, 20, 25, 30, 35, 40, 45, 50, 60, 70, 80, 90, 100, 110, 120, 150, 170, 200, 250, 300, 350, 400, 450, 500, 600, 700, 800, 900, or 1000 kg/m$^3$.

Average bulk density has significant bearing on the insulation performance of the non-woven fibrous web. When the average bulk density of the non-woven fibrous web is significantly higher than 50 kg/m$^3$, a significant amount of heat can be transmitted through the insulator by thermal conduction through the fibers themselves. When the average bulk density is significantly below 15 kg/m$^3$, heat conduction through the fibers is small but convective heat transfer can become significant. Further reduction of average bulk density can also degrade strength of the non-woven fibrous web, which is not desirable.

Phosphinates and Polymeric Phosphonates

The thermoplastic polymers used to make the primary fibers of the provided non-woven fibrous webs are blended with a phosphorus-containing polymer. The phosphorus-containing polymer preferably contains at least one phosphinates or polymeric phosphonate, the latter also sometimes referred to as a polyphosphonate.

Phosphinates are organophosphorus compounds having the general formula $R_2(R_1O)P=O$, with a structure similar to that of hypophosphorous acid. Phosphonates are organophosphorus compounds containing $C-PO(OH)_2$ or $C-PO(OR)_2$ groups, where R represents an alkyl or aryl group. Polymeric phosphonates are polymers that contain phosphonates in their repeat units.

Phosphinates, polymeric phosphonates and their derivatives are useful additives for their flame-retardant properties. Polymeric flame-retardants can be advantageous over non-polymeric alternatives because of their lower volatility, decreasing leaching tendency, and improved compatibility with base polymers.

Advantageously, phosphorus-based flame-retardants are effective without use of halogens such as bromine, chlorine, fluorine, and iodine, enabling the non-woven fibrous web to be made substantially free of any halogenated flame-retardant additives. Use of halogenated compounds have been disfavored for environmental, health and safety reasons.

Polymeric phosphonate homopolymers can be brittle at ambient temperatures, and this brittleness can be mitigated by copolymerizing polymeric phosphonates with a thermoplastic polymer. Thermoplastic polymers that can be used for this purpose include, for example, polyethylene terephthalate, polyethylene, and polycarbonate. Copolymerized products include random or block copolymers.

The polymeric phosphonate may be a polymeric phosphonate, copoly(phosphonate ester), copoly(phosphonate carbonate). These polymers, broadly construed herein to include oligomers, can include repeating units derived from diaryl alkyl- or diaryl arylphosphonates. In some instances, the polymeric phosphonate includes an oligophosphonate, random co-oligo(phosphonate ester), block co-oligo(phosphonate ester), random co-oligo(phosphonate carbonate), and/or block co-oligo(phosphonate carbonate).

In some embodiments, the polymeric phosphonate contains one or more phenolic end groups. If desired, the phenolic end groups can be reactive with functional groups present on the thermoplastic polymer used in the melt-blown fibers of the provided fibrous non-woven webs.

The phosphorus content in the additive can be directly correlated with the degree of flame retardancy in the provided webs. The polymeric phosphonate can have a phosphorus content in the range from 1 wt % to 50 wt %, from 5 wt % to 50 wt %, from 5 wt % to 30 wt %, or in some embodiments, less than, equal to, or greater than 1 wt %, 2, 3, 4, 5, 6, 7, 8, 9, 10, 12, 15, 17, 20, 22, 25, 27, 30, 35, 40, 45, or 50 wt %, based on the overall weight of the polymeric phosphonate.

Useful phosphinate compounds include those that are meltable at temperatures used in melt blowing processes. Meltable phosphinate compounds can, for example, have a melting temperature of less than, equal to, or greater than 100° C., 110, 120, 130, 140, 150, 160, 170, 180, 190, 200, 210, 220, 230, 240, 250, 260, 270, 280, 290, or 300° C.

Further details concerning the preparation and chemical and physical properties of phosphinate and polymeric phosphonate materials can be found in, for example, U.S. Pat. No. 4,719,279 (Kauth et al.); U.S. Pat. No. 6,861,499 (Vinciguerra et al.); and U.S. Pat. No. 9,695,278 (Kagumba et al.); and U.S. Patent Publication Nos. 2006/0020064 (Bauer et al.) and 2012/0121843 (Lebel et al.).

Certain phosphinates and polymeric phosphonates were found to be chemically compatible with certain thermoplastic polymers useful in forming primary fibers in the non-woven fibrous web. Chemical compatibility can be manifested, for example, by the homogenous blending of these polymers such that the fiber cross-section has the appearance of a single uniform phase under scanning electron microscopy. Polyethylene terephthalate was observed to form a compatible polymer blend with co-oligo(phosphonate carbonate) in a melt blowing process, as shall be described in a later subsection. In some embodiments, this interaction between the polymeric phosphonate additive and thermoplastic resin enables formation of finer fibers than would be obtained using the thermoplastic resin without the additive.

The polymeric phosphonate can have a glass transition temperature that further reduces melt viscosity and facilitates processability of the resulting polymer blend. The glass transition temperature can also affect how it is incorporated into a melt blowing manufacturing process. A higher $T_g$ can be desirable for use with a solid particle feeder because pellets, flakes, powders with low $T_g$ are more susceptible to becoming tacky as they enter the feed throat of the twin screw extruder. If they become tacky enough, they can cling to the feed throat and cause a blockage. For low $T_g$ materials, certain techniques can be used to overcome the feed throat blockage problem. For example, they can be melted in a grid melter and injected into the barrel of the twin screw extruder.

Generally, the glass transition temperature of the polymeric phosphonate can be in the range from −40° C. to 200° C., from 0° C. to 200° C., from 0° C. to 150° C., from 70° C. to 120° C., or in some embodiments, less than, equal to, or greater than −40° C., −35, −30, −25, −20, −15, −10, −5, 0, 5, 10, 15, 20, 25, 30, 35, 40, 45, 50, 55, 60, 65, 70, 75, 80, 85, 90, 100, 110, 120, 130, 140, 150, 160, 170, 180, 190, or 200° C.

Molecular weight of the polymeric phosphonate can be chosen to balance the factors of flame retardancy, melt viscosity at process temperatures, thermo-oxidative stability, and toughness. The polymeric phosphonate can have a number average molecular weight in the range from 100 g/mol to 10000 g/mol, from 500 g/mol to 6000 g/mol, from 1000 g/mol to 6000 g/mol, or in some embodiments, less than, equal to, or greater than 100 g/mol, 110, 120, 130, 140, 150, 160, 170, 180, 190, 200, 220, 250, 270, 300, 350, 400, 450, 500, 600, 700, 800, 900, 1000, 1100, 1200, 1300, 1400, 1500, 1600, 1700, 1800, 1900, 2000, 2100, 2200, 2300, 2400, 2500, 3000, 3200, 3500, 3700, 4000, 4500, 5000, 5500, 6000, 6500, 7000, 7500, 8000, 8500, 9000, 9500, or 10000 g/mol.

Similarly, the polymeric phosphonate can be present in any amount suitable to obtain the degree of flame retardancy desired and obtain acceptable fibers diameter in the melt blowing manufacturing process for a given raw materials cost. While not particularly restricted, the amount of polymeric phosphonate present can be in an amount ranging from 5 wt % to 50 wt %, from 10 wt % to 50 wt %, from 15 wt % to 50 wt %, or in some embodiments, less than, equal to, or greater than 5 wt %, 6, 7, 8, 9, 10, 11, 12, 13, 14, 15, 16, 17, 18, 19, 20, 21, 22, 23, 24, 25, 26, 27, 28, 29, 30, 32, 35, 37, 40, 42, 45, 47 or 50 wt %, based on the overall weight of the plurality of melt-blown fibers.

In conventional melt-blown non-woven fibrous webs, there is an inverse correlation between the average diameter of directly formed fibers and the concentration of flame-retardant additives. Surprisingly, blending of polymeric phosphonate into certain thermoplastic polymers was found to reduce melt viscosity of the polymeric blend relative to that of the thermoplastic polymer alone. This, in turn, makes it possible to retain fine fibers, or in some cases, reduce fiber diameter relative to that obtained using the thermoplastic polymer alone while simultaneously improving flame-retardancy of the non-woven fibrous web.

More particularly, it was discovered that mixing the thermoplastic polymer with certain phosphinates or polymeric phosphonates in a melt blowing process can result in a median fiber diameter that is at least 10 percent, at least 20 percent, or at least 30 percent, or in some embodiments, at least 5 percent, 6, 7, 8, 9, 10, 11, 12, 13, 14, 15, 17, 20, 22, 25, 27, 30, 32, 35, 37, or 40 percent less than would be obtained absent mixing the thermoplastic polymer with the phosphinate or polymeric phosphonate.

Fine melt-blown fibers are of great technical benefit in thermal and acoustic insulation applications. In acoustics, the high surface area per unit volume results in enhanced viscous dissipation of sound energy within the non-woven fibrous web. In thermal applications, the fine fibers trap air and block radiant heat loss, making the non-woven fibrous web an effective insulator.

Although not necessary, other phosphate-containing compounds can also be added to improve flame retardancy. The thermoplastic polymer used to form the primary fibers may be further blended, for example, with one or more chlorinated phosphate esters. Useful chlorinated phosphate esters include tris(2-chloroethyl) phosphate, 2-propanol-1-chloro phosphate, and 2-propanol-1,3-dichloro phosphate. Preferably these other added phosphate-containing compounds are compatible with the thermoplastic polymer and form a homogenous phase with the thermoplastic polymer.

Chlorinated phosphate esters can be blended with the thermoplastic polymer in any suitable amount. Suitable amounts can range from 5 wt % to 60 wt %, from 5 wt % to 50 wt %, from 10 wt % to 30 wt %, or in some embodiments, less than, equal to, or greater than 5 wt %, 10, 15, 20, 25, 30, 35, 4, 45, 50, 55, or 60 wt %, based on the overall weight of the plurality of melt-blown fibers.

Secondary Fibers

The provided non-woven fibrous webs can optionally contain a plurality of secondary fibers intermingled with the plurality of directly formed primary fibers. Secondary fibers can be staple fibers, and can be uniformly distributed throughout the web. Often, they are significantly thicker than the primary fibers to provide mechanical reinforcement. Incorporation of secondary fibers can provide many potential benefits to the web, including increased loft (or lower density), resilience, and/or strength. These fibers can also improve the thermal or acoustic insulation properties of the web.

Secondary fibers can be made from any of the thermoplastic polymers already disclosed for the primary fibers. Useful polymers for thermal and acoustic insulation include high temperature polymers such as, for example, polyetherimide and semicrystalline thermoplastic polymers such as polyethylene terephthalate or polyphenylene sulfide.

The secondary fibers can be present in any amount sufficient to provide the web with the desired enhancement in mechanical properties. The secondary fibers can be present in an amount in the range from 10 wt % to 90 wt %, 30 wt % to 70 wt %, 35 wt % to 65 wt %, or in some embodiments, less than, equal to, or greater than 10 wt %, 15, 20, 25, 30, 35, 40, 45, 50, 55, 60, 65, 70, 75, 80, 85, or 90 wt %, relative to the overall weight of the non-woven fibrous web.

In some cases, secondary fibers can be made from non-meltable materials. Non-meltable materials, do not become a liquid at any temperature and may be polymeric or non-polymeric. Many of these materials do not melt because they oxidize or otherwise degrade first when heated in the presence of air. Non-meltable polymeric fibers can include carbon fibers, carbon fiber precursors, or a combination thereof. If incorporated in sufficient amounts, these secondary fibers can significantly enhance the flame retardancy of the overall web.

Carbon fiber precursors can include oxidized acrylic precursors, such as oxidized polyacrylonitrile. Polyacrylonitrile is a useful acrylic precursor that can be used widely to produce the carbon fibers. In some embodiments, the polyacrylonitrile contains more than 70 wt %, more than 75 wt %, more than 80 wt %, or more than 85 wt % acrylonitrile repeat units.

Non-meltable polymeric fibers other than oxidized polyacrylonitrile fibers can also be used. Such fibers include dehydrated cellulosic precursors such as rayon. Non-meltable polymeric fibers further include lignin fibers. Lignin is a complex polymer of aromatic alcohols known as monolignols, which are derived from plants. Monolignol monomers include p-coumaryl alcohol, coniferyl alcohol, and sinapyl alcohol, which are methoxylated to varying degrees.

Non-meltable polymeric fibers also include certain thermoset materials, such as epoxy, polyimide, melamine, and silicone. Natural fibers, such as cotton, linen, hemp, silk, and animal hairs, simply burn without melting. Rayon is a material made from cellulose. When cellulose burns, it produces carbon dioxide, water and a char.

Carbon fiber precursors can also include pitch-based precursors. Pitches are complex blends of polyaromatic molecules and heterocyclic compounds, which can be used as precursors of carbon fibers or carbon fillers in carbon composites. Vinylidene chloride and phenolic resins can, in some embodiments, be precursors for manufacture of carbon fibers.

In a preferred embodiment, the non-meltable fibers are comprised of oxidized polyacrylonitrile fibers. The oxidized polyacrylonitrile fibers can include, for example, those available under the trade designations PYRON (Zoltek Corporation, Bridgeton, Mo.) and PANOX (SGL Group, Meitingen, Germany).

Oxidized polyacrylonitrile fibers can be made from precursor fibers containing a copolymer of acrylonitrile and one or more co-monomers. Useful co-monomers include, for example, methyl methacrylate, methyl acrylate, vinyl acetate, and vinyl chloride. The co-monomer(s) may be present in an amount of up to 15 wt %, 14 wt %, 13 wt %, 12 wt %, 11 wt %, 10 wt %, 9 wt %, or 8 wt %, relative to the overall weight of the monomer mixture prior to copolymerization.

The precursor fibers can be oxidized in a multi-step process. The fibers are initially stabilized at high temperatures to prevent melting or fusion of the fibers, then carbonized to eliminate the non-carbon elements, and finally graphitized at even higher temperatures to enhance the mechanical properties of the fibers. Oxidized polyacrylonitrile fibers include polyacrylonitrile fibers that are either partially or fully oxidized, and may or may not be graphitized.

The non-meltable secondary fibers can have a fiber diameter and length that enables the fibers to become entangled within the non-woven fibrous web. The fibers, however, are preferably not so thin that web strength is unduly compromised. For most applications, the secondary fibers can have a median fiber diameter in the range from 10 micrometers to 1000 micrometers, from 15 micrometers to 300 micrometers, from 20 micrometers to 100 micrometers, or in some embodiments, less than, equal to, or greater than 10 micrometer, 11, 12, 13, 15, 17, 20, 25, 30, 35, 40, 45, 50, 60, 70, 80, 90, 100, 150, 200, 250, 300, 350, 400, 450, 500, 600, 700, 800, 900, or 1000 micrometers.

Use of relatively long fibers can reduce fiber shedding and further enhance strength of the non-woven fibrous web along transverse directions. The secondary fibers can have an average fiber length in the range from 10 millimeters to 100 millimeters, from 15 millimeters to 100 millimeters, from 25 millimeters to 75 millimeters, or in some embodiments, less than, equal to, or greater than 10 millimeters, 12, 15, 17, 20, 25, 30, 35, 40, 45, 50, 55, 60, 65, 70, or 75 millimeters.

Secondary fibers need not be exclusively comprised of either meltable or non-meltable fibers. For improved processability, it can be advantageous to use a fiber mixture in which meltable fibers are mixed with non-meltable fibers. The material used for the meltable fibers is not particularly restricted, and could include any of the thermoplastic polymers previously described, including the amorphous and semi-crystalline aromatic and aliphatic polymers used to make the directly formed fibers.

If such a fiber mixture is used, the secondary fibers can include a blend of non-meltable fibers and meltable fibers where the meltable fibers represent from 1 wt % to 95 wt %, from 5 wt % to 95 wt %, from 5 wt % to 90 wt %, from 5 wt % to 30 wt %, from 10 wt % to 25 wt %, or in some embodiments, less than, equal to, or greater than 1 wt %, 2, 3, 4, 5, 6, 7, 8, 9, 10, 12, 15, 17, 20, 25, 30, 35, 40, 45, 50, 55, 60, 65, 70, 75, 80, 85, 90, or 95 wt % of the overall weight of secondary fibers present in the non-woven fibrous web.

To maximize flame retardancy in the finished non-woven fibrous web, it can be advantageous for any meltable fibers present to be blended with flame-retardant additives. In a preferred embodiment, the meltable fibers can contain one or more phosphinates or polymeric phosphonates as disclosed previously with respect to the directly formed fibers. In some embodiments, the meltable fibers have the same or similar compositions to those used in the directly formed fibers. For example, a secondary fiber system could include oxidized polyacrylonitrile staple fibers mixed with polyethylene terephthalate fibers containing co-oligo(phosphonate carbonate).

Non-Woven Fibrous Articles and Assemblies

The non-woven fibrous webs of the present disclosure can be found in articles and assemblies deployed in any of a number of thermal and acoustic applications. Exemplary thermal and acoustic applications include, for example, battery compartments for electric vehicles, engine compartments, automotive vehicle doors and ceilings, railway car insulation applications such as under window and floor treatments in trains, automotive trunks, automotive under hood applications, building and utility wraps, furniture upholstery, exit walkways on aircraft or in buildings, heating ventilation and air conditioning (HVAC) systems, rotorcraft cabins, and aerospace fuselages.

In its simplest form, the provided non-woven fibrous web can be used as a standalone article as shown in FIG. 1 and referred to by the numeral 100. As shown, the non-woven fibrous web 100 is a monolithic layer with opposed first and second major surfaces 102, 104. The non-woven fibrous web 100 can be partially or fully enclosed by cavity walls or other structural elements that render fastening mechanisms unnecessary.

Figure 2:
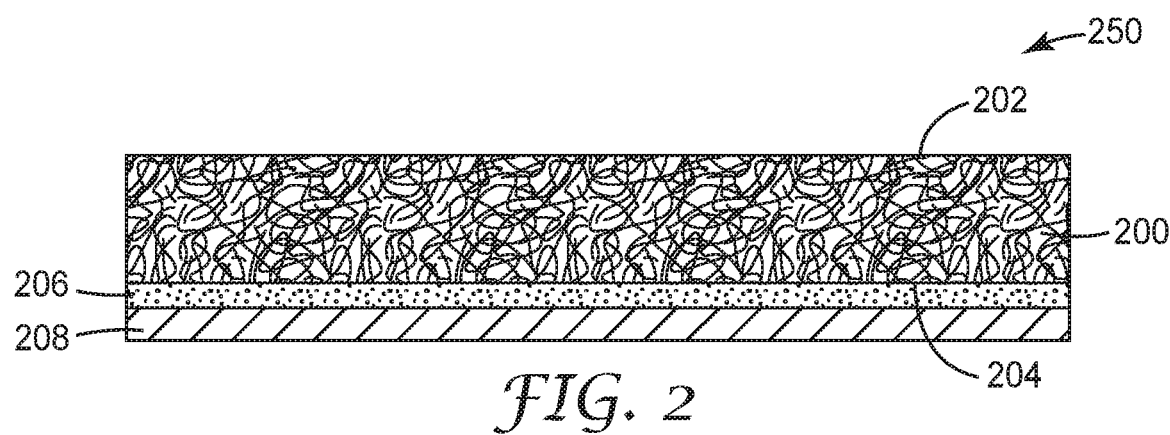
FIGS. 2-3 are a side, cross-sectional views of a non-woven fibrous web assemblies according to respective exemplary embodiments.

FIG. 2 shows an adhesive-backed non-woven fibrous assembly 250 that includes a non-woven fibrous web 200 having first and second major surfaces 202, 204. Features of the non-woven fibrous web 200 are essentially analogous to those of non-woven fibrous web 100 and shall not be repeated.

Extending across and contacting the second major surface 204 is an adhesive layer 206. Extending across and contacting the adhesive layer 206 opposite the non-woven fibrous web 200 is a release liner 208. The non-woven fibrous web 200 and adhesive layer 206 can be collectively peeled from the release liner 208 and then affixed to a substrate surface to enhance thermal and/or acoustic absorption or barrier properties along that surface.

The adhesive layer 206 can be, in some embodiments, a pressure-sensitive adhesive, whereby the non-woven fibrous web 200 can be adhered like a tape to a substrate. Alternatively, the adhesive layer 206 can be made from a curable, or otherwise hardenable, composition that is placed in contact with the substrate and then thermally or chemically activated to create a permanent bond to the substrate.

In some embodiments, the adhesive layer 206 can be comprised of one or more binders that are, to some degree, fire-resistant. Fire-resistant binders include polymeric binders. Polymeric binders include fluoropolymers, including perfluoropolymers, polytetrafluoroethylene, and thermoplastic fluoropolymers such as hexafluoropropylene-vinylidene fluoride-tetrafluoroethylene polymer. Polymeric binder can also include vinyl, rubber, fluoroelastomers, polyvinyl chloride, and polymers of urethane, acrylics, or silicone. The binder can, in some embodiments, comprise a blend of a fluoropolymer and a polyimide, a polyamideimide, or a polyphenylene sulfide.

Some polymeric binders, such as thermoplastic binders, can be readily melted to obtain a flowable composition that coats the surfaces to be bonded, and then cooled to form the bond. These materials can be heat laminated to each other using either a manual or continuous process.

Other polymeric binders are curable polymeric binders that crosslink upon being heated, exposed to actinic radiation, or otherwise chemically activated. Curable polymeric binders include water-based latexes such as latexes of polyurethane or (meth)acrylate polymer. Other curable binders include, but are not limited to, epoxies, epoxy curing agents, phenolics, phenols, cyanate esters, polyimides (e.g., bismaleimide and polyetherimides), polyesters, benzoxazines, polybenzoxazoles, polybenzoxazones, polybenzimidazoles, polybenzothiazoles, polyamides, polyamidimides, polysulphones, polyether sulphones, polycarbonates, polyethylene terephthalates, cyanates, cyanate esters, polyether ketones (e.g., polyether ketone, polyether ether ketone, polyether ketone ketone), combinations thereof, and precursors thereof.

Figure 3:
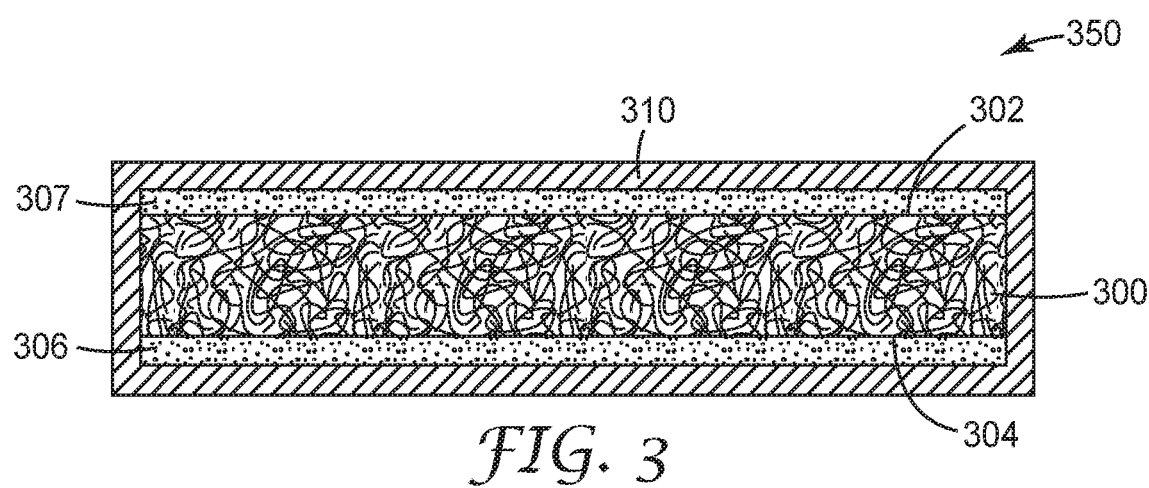

FIG. 3 show a non-woven fibrous assembly 350 bearing certain similarities to the prior embodiments of FIGS. 1 and 2, in which a non-woven fibrous web 300 has adhesive layers 306, 307 disposed on its major surfaces 304, 306, respectively. The non-woven fibrous web 300 is wrapped in an outer layer 310. Optionally and as shown, the outer layer 310 fully encapsulates the non-woven fibrous web 300 such that no surface of the non-woven fibrous web 300 is exposed.

In the configuration depicted in FIG. 3, the adhesive layers 306, 307 enhance integrity of the non-woven fibrous assembly 300 by preventing the outer layer 310 and the non-woven fibrous web 300 from sliding relative to each other. For applications where such sliding is not a concern, one or both of the adhesive layers 306, 307 may be omitted. The adhesive layers 306, 307 can be comprised of one or more binders that are, to some degree, fire-resistant as defined previously with respect to adhesive layer 206 in FIG. 2.

The outer layer 310 can be made from a material that is itself flame-retardant. The outer layer 310 can provide the overall non-woven fibrous assembly 300 with enhanced flame resistance, relative to the non-woven fibrous web 300 taken alone and having the same dimensions. It is possible for the outer layer 310 to function as a fire barrier that blocks propagation of a fire into the non-woven fibrous web 300. Suitable fire barriers can be made from a flexible and non-combustible material, such a woven or non-woven web of non-combustible fibers.

Suitable non-combustible fibers include ceramic fibers. Various known ceramic fibers can be adapted for use in refractory, insulation, and fire barrier materials. Known ceramic materials that can be made into high-temperature fibers include glass, silica, silicon carbide, alumina, alumina silica, and basalt. Most of these fibers can resist temperatures in excess of 1000° C. and can also be very strong.

Particularly useful ceramic fibers for this application include ceramic oxide fibers that can be processed into fire-resistant fabrics. These materials can be made suitable for textiles by mixing small amounts of silica, boron oxides, or zirconium oxides into alumina to avoid formation of large crystalline grains, thereby reducing stiffness and increasing strength at ambient temperatures. Commercial examples of these fibers include filament products provided under the trade designation NEXTEL by 3M Company, St. Paul, Minn. These fibers can be converted into woven fibrous webs that display both fire barrier properties and high strength.

Other useful materials that can be used in the fire barrier include ceramic fiber materials that combine alkaline earth silicate (AES) low biopersistent fibers, aluminosilicate ceramic fibers (RCF), and/or alumina silica fibers and vermiculite with an acrylic latex and other refractory materials to obtain a heat-resistant non-woven fibrous web, or mat. Examples of these are described, for example, in PCT Publication No. WO 2018/093624 (De Rovere, et al.) and U.S. Pat. No. 6,051,103 (Lager, et al.). In some cases, these fiber materials are blended with flame-retardant additives such as aluminum trihydrate. These materials are optionally intumescent, whereby the material swells up when heated to seal openings in the event of a fire. Examples of these ceramic fiber materials include products provided under the trade designation FYREWRAP by Unifrax I LLC, Tonawanda, N.Y.

Still other fire barrier materials can be made by combining both organic and inorganic fibers to form a fire-resistant fibrous felt. For example, fibers of silica, polyphenylene sulfide, and poly paraphenylene terephthalamide can be formed into a coated fabric. Some of these fabrics, available from TexTech Industries, Portland, Me., have been used as burnthrough insulation in aerospace applications.

The provided non-woven fibrous webs and assemblies display numerous advantages, at least some of which are unexpected. These materials can be used in thermal and acoustic insulation applications at high temperatures where conventional insulation materials would thermally degrade or fail. Particularly demanding are automotive and aerospace vehicle applications, where insulation materials operate in environments that are not only noisy but can reach extreme temperatures.

The provided webs are capable of passing standardized flammability and flame propagation tests used in regulated industries such as automotive and aerospace vehicles. In some embodiments, a 20-millimeter thick sample of the non-woven fibrous web is capable of passing one or more of the flammability tests UL 94 V0, FAR 25.853(a), and FAR 25.856(a).

The provided webs can also resist shrinkage at temperatures as high as 150° C. or greater, as might be encountered in automotive and aerospace applications. Shrinkage can result from crystallization during heat exposure or processing, and is generally undesirable because it can degrade acoustic performance and impact the structural integrity of the product. The provided non-woven fibrous webs can exhibit a Shrinkage after being heated to 150° C. for 60 minutes, 1 day, and/or 7 days. In exemplary embodiments, the Shrinkage under the above conditions can be less than 15%, 14%, 13%, 12%, 11%, 10%, 9%, 8%, 7%, 6%, 5%, 4%, 3%, 2% or 1%. Such Shrinkage values can apply along both the machine and cross-web directions.

The provided non-woven fibrous webs can be characterized, in an acoustic context, by their flow resistance. Flow resistance represents the pressure difference between the two sides of the web with particle velocity going through the layer. This property can be measured in units of MKS Rayls, where 1 Rayl is equal to 1 pascal-second per meter (Pa·s/m), or equivalently, 1 newton-second per cubic meter (N·s/m$^3$), or alternatively, 1 kg/[s·m$^2$]. The acoustic importance of flow resistance as a function of sound frequency is more fully described in U.S. Pat. No. 6,256,600 (Bolton et al.).

For low frequency acoustic performance, the flow resistance through the non-woven fibrous web can be from 800 MKS Rayls to 10,000 MKS Rayls, 1000 MKS Rayls to 2000 MKS Rayls, or 1000 MKS Rayls to 1500 MKS Rayls. For a general broadband acoustic absorption, the web can have a flow resistance of from 300 MKS Rayls to 700 MKS Rayls. In various embodiments, the flow resistance through the provided non-woven fibrous web is less than, equal to, or greater than 20 MKS Rayls, 25, 30, 35, 40, 45, 50, 60, 70, 80, 90, 100, 120, 150, 170, 200, 250, 300, 350, 400, 450, 500, 550, 600, 650, 700, 750, 800, 900, 1000, 1200, 1500, 1700, 2000, 2500, 3000, 3500, 4000, 4500, 5000, 6000, 7000, 8000, 9000, or 10,000 MKS Rayls.

The provided non-woven fibrous webs can provide acoustic absorption over a wide range of frequencies. The ratio of the absorbed sound energy to the incident energy represents a sound absorption coefficient. A 400 gsm sample of the provided web can, in various embodiments, display a sound absorption coefficient that is greater than 0.2, greater than 0.3, greater than 0.4, or in some embodiments, less than, equal to, or greater than 0.2, 0.25, 0.3, 0.35, 0.4, 0.45, 0.5, 0.55, 0.6, 0.65, or 0.7 at an acoustic frequency of 1000 Hz when tested under ambient conditions.

Methods of Manufacture

At least some fibers in the non-woven fibrous webs are directly formed from thermoplastic polymeric fibers using a melt blowing process. In a melt-blowing process, one or more thermoplastic polymer streams are extruded through a die containing closely arranged orifices and attenuated by convergent streams of hot air at high velocities to form fine fibers. These fine fibers can be collected on a surface to provide a melt-blown non-woven fibrous web.

Depending on the degree of solidification from the molten state, the collected fibers can be semi-continuous or essentially discontinuous. In certain exemplary embodiments, the melt-blown fibers of the present disclosure may be oriented on a molecular level. As an option, at least some of the plurality of fibers in the non-woven fibrous web are physically bonded to each other through heat and pressure applied or by calendering.

Other techniques for bonding the fibers is taught in, for example, U.S. Patent Publication No. 2008/0038976 (Berrigan et al.) and U.S. Pat. No. 7,279,440 (Berrigan et al.). One technique involves subjecting the collected web of fibers and fibers to a controlled heating and quenching operation that includes forcefully passing through the web a gaseous stream heated to a temperature sufficient to soften the fibers sufficiently to cause the fibers to bond together at points of fiber intersection, where the heated stream is applied for a time period too short to wholly melt the fibers, and then immediately forcefully passing through the web a gaseous stream at a temperature at least 50° C. less than the heated stream to quench the fibers.

In some embodiments, the process includes forming a multiplicity of melt-blown fibers by passing a molten stream including molecules of at least one thermoplastic semi-crystalline polymer and a phosphinate or polymeric phosphonate through a multiplicity of orifices of a melt-blowing die, subjecting at least a portion of the melt-blown fibers to a controlled in-flight heat treatment operation immediately upon exit of the melt-blown fibers from the multiplicity of orifices, wherein the controlled in-flight heat treatment operation takes place at a temperature below a melting temperature of the portion of the melt-blown fibers for a time sufficient to achieve stress relaxation of at least a portion of the molecules within the portion of the fibers subjected to the controlled in-flight heat treatment operation, and collecting at least some of the portion of the melt-blown fibers subjected to the controlled in-flight heat treatment operation on a collector to form a non-woven fibrous web. The non-woven fibrous web exhibits a Shrinkage (as determined using the methodology described herein) less than a Shrinkage measured on a structure not subject to the in-flight heat treatment operation.

In some embodiments, the process includes providing to a melt-blowing die a molten stream of a thermoplastic material including at least one thermoplastic semicrystalline polymer and a phosphinate or polymeric phosphonate wherein the thermoplastic material does not contain a nucleating agent in an amount effective to achieve nucleation, melt-blowing the thermoplastic material into at least one fiber, and subjecting the at least one fiber immediately upon exiting the melt-blowing die and prior to collection as a non-woven fibrous web on a collector, to a controlled in-flight heat treatment operation at a temperature below a melting temperature of the at least one thermoplastic semi-crystalline polymer for a time sufficient for the non-woven fibrous web to exhibit a Shrinkage less than a Shrinkage measured on an identically-prepared structure that is not subjected to the controlled in-flight heat treatment operation.

The result of the melt blowing process can be a non-woven fibrous web that includes a multiplicity of melt-blown fibers containing molecules of at least one thermoplastic semi-crystalline polymer and a phosphinate or polymeric phosphonate, wherein the thermoplastic material does not contain a nucleating agent in an amount effective to achieve nucleation, and further wherein the non-woven fibrous web is dimensionally stable and exhibits a Shrinkage less than 15%, after being heated to 150° C. for 60 minutes.

Further options and advantages associated with the in-flight heat treatment operation and of non-woven fibrous webs made therefrom, are described in detail in U.S. Patent Publication Nos. 2016/0298266 (Zillig et al.) and International Patent Publication No. WO 2018/0126085 (Ren et al.).

While the thermoplastic polymer and phosphinate or polymeric phosphonate are preferably miscible, different molecular phases can be present within the fibers. For example, a predominantly semi-crystalline phase may co-exist with a predominantly amorphous phase. In other embodiments, a predominantly semi-crystalline phase may co-exist with a phase containing domains of lower crystalline order (e.g., one in which the polymers are not chain-extended) and domains that are amorphous, the overall degree of order being insufficient for crystallinity. Such fibers can also be processed under heat as above to form a non-woven fibrous web.

Preferably, the fibers do not substantially melt or lose their fiber structure during the bonding operation but remain as discrete fibers with their original fiber dimensions.

Secondary fibers, if present, can be generally obtained from bulk fibers. One technical challenge with incorporating secondary fibers into a non-woven fibrous web arises out of difficulties in handling and feeding these fibers into a large-scale manufacturing process. This is especially problematic when dealing with non-meltable fibers such as oxidized polyacrylonitrile fibers which tend to be weakly entangled and can unravel easily in bulk form.

This difficulty can be overcome by using a blend of secondary fibers that includes both non-meltable fibers and thermoplastic reinforcement fibers having a significantly larger diameter. In an exemplary embodiment, a pre-formed feed web could be obtained by blending oxidized polyacrylonitrile fibers having a median fiber diameter in the range of 5 micrometers to 15 micrometers and polyethylene terephthalate staple fibers having a median fiber diameter in the range of 30 micrometers to 60 micrometers. Here, the inclusion of polyethylene terephthalate staple fibers provide significant strength to the feed web.

To provide further strength to the feed web, the blended fibers can be substantially entangled with each other using a process such as needle tacking or hydroentangling. Optionally, these fibers are crimped to provide greater web thickness and reduce bulk density. Details in the process of making these webs are described in co-pending International Patent Application No. PCT/CN2017/110372 (Cai, et al.).

Once a feed web with suitable strength has been made, it can be transferred to a separate melt blowing process, where into a multicomponent melt-blown microfiber web can be made according to any of the methods described in U.S. Pat. No. 4,118,531 (Hauser); U.S. Pat. No. 5,298,694 (Thompson et al.); U.S. Pat. No. 5,773,375 (Swan, et al.); U.S. Pat. No. 5,961,905 (Swan, et al.); and U.S. Pat. No. 7,476,632 (Olson, et al.).

It is not critical to use a feed web in manufacturing webs containing secondary fibers. For example, in alternative manufacturing processes, a layer of unbonded staple fibers are conveyed directly onto the lickerin roll on a moving belt and the web formed using any of the methods cited above.

In an exemplary process, flow stream of a thermoplastic polymer is fed into a manifold. The flow stream is then fed into the die and through a series of die orifices. Air slots are disposed on either side of the die orifices and direct uniform heated air at high velocities at the extruded melt stream. The hot high velocity air draws and attenuates the extruded polymeric material which solidifies after traveling a relatively short distance from the die. The high velocity air becomes turbulent between the die and the collector surface causing the melt-blown fibers entrained in the airstream to become intimately mixed.

In mid-flight between the melt blowing die and the collector, this mixed stream of melt-blown fibers is blended with secondary fibers from the feed web, which can be continuously plucked from a leading edge of the feed web by a rotating lickerin roll. The plucked secondary fibers are directed into the turbulent airstream, where it is uniformly dispersed and distributed along with the melt-blown fibers and eventually gathered on a perforated collector drum or mesh belt to provide a coherent non-woven web.

As a further option, a subsequent activation process can be used to bind meltable fibers to each other at points of inter-fiber contact. This can be achieved by passing the web through an oven heated to a temperature at or above the softening point of the meltable fibers or the meltable sheath of the shear/core fiber, if used. Such inter-fiber bonded webs can have increased physical integrity and tensile strength as a result of the additional bonds formed between fibers.

While not intended to be exhaustive, further exemplary embodiments are provided below:

1. A non-woven fibrous web comprising: a plurality of melt-blown fibers comprising a thermoplastic polymer blended with a phosphinate and/or polymeric phosphonate, wherein the nonwoven fibrous structure exhibits a Shrinkage of less than 15% after being heated to 150° C. for 60 minutes.
2. A non-woven fibrous web comprising: a plurality of melt-blown fibers comprising a thermoplastic polymer blended with a phosphinate and/or polymeric phosphonate, wherein the thermoplastic polymer is substantially free of any nucleating agent in an amount effective to achieve nucleation.
3. The non-woven fibrous web of embodiment 1 or 2, wherein the thermoplastic polymer comprises a polyester.
4. The non-woven fibrous web of embodiment 3, wherein the polyester comprises polyethylene terephthalate.
5. The non-woven fibrous web of any one of embodiments 1-4, wherein the polymeric phosphonate comprises an oligophosphonate, random co-oligo(phosphonate ester), block co-oligo(phosphonate ester), random co-oligo(phosphonate carbonate), or block co-oligo(phosphonate carbonate).
6. The non-woven fibrous web of any one of embodiments 1-5, wherein the phosphinate and/or polymeric phosphonate contains one or more phenolic end groups.
7. The non-woven fibrous web of any one of embodiments 1-6, wherein the phosphinate and/or polymeric phosphonate has a phosphorus content in the range from 1 wt % to 50 wt % based on the overall weight of the polymeric phosphonate.
8. The non-woven fibrous web of embodiment 7, wherein the phosphinate and/or polymeric phosphonate has a phosphorus content in the range from 5 wt % to 50 wt % based on the overall weight of the polymeric phosphonate.
9. The non-woven fibrous web of embodiment 8, wherein the phosphinate and/or polymeric phosphonate has a phosphorus content in the range from 5 wt % to 30 wt % based on the overall weight of the polymeric phosphonate.
10. The non-woven fibrous web of any one of embodiments 1-9, wherein the polymeric phosphonate has a glass transition temperature in the range from −40° C. to 200° C.
11. The non-woven fibrous web of embodiment 10, wherein the polymeric phosphonate has a glass transition temperature in the range from 0° C. to 200° C.
12. The non-woven fibrous web of embodiment 11, wherein the polymeric phosphonate has a glass transition temperature in the range from 0° C. to 150° C.
13. The non-woven fibrous web of any one of embodiments 1-12, wherein the polymeric phosphonate has a number average molecular weight in the range from 100 g/mol to 10000 g/mol.
14. The non-woven fibrous web of embodiment 13, wherein the polymeric phosphonate has a number average molecular weight in the range from 500 g/mol to 6000 g/mol.
15. The non-woven fibrous web of embodiment 14, wherein the polymeric phosphonate has a number average molecular weight in the range from 1000 g/mol to 6000 g/mol.
16. The non-woven fibrous web of any one of embodiments 1-15, wherein the phosphinate and/or polymeric phosphonate is present in an amount ranging from 5 wt % to 50 wt % based on the overall weight of the plurality of melt-blown fibers.
17. The non-woven fibrous web of embodiment 16, wherein the phosphinate and/or polymeric phosphonate is present in an amount ranging from 10 wt % to 50 wt % based on the overall weight of the plurality of melt-blown fibers.
18. The non-woven fibrous web of embodiment 17, wherein the phosphinate and/or polymeric phosphonate is present in an amount ranging from 15 wt % to 50 wt % based on the overall weight of the plurality of melt-blown fibers.
19. The non-woven fibrous web of any one of embodiments 1-18, wherein the plurality of melt-blown fibers has a median fiber diameter in the range from 0.2 micrometers to 20 micrometers.
20. The non-woven fibrous web of embodiment 19, wherein the plurality of melt-blown fibers has a median fiber diameter in the range from 0.5 micrometers to 15 micrometers.
21. The non-woven fibrous web of embodiment 20, wherein the plurality of melt-blown fibers has a median fiber diameter in the range from 1 micrometers to 10 micrometers.
22. The non-woven fibrous web of any one of embodiments 1-22, further comprising a plurality of secondary fibers having a median fiber diameter of from 8 micrometers to 1000 micrometers.
23. The non-woven fibrous web of embodiment 22, wherein the plurality of secondary fibers have a median fiber diameter of from 15 micrometers to 300 micrometers.
24. The non-woven fibrous web of embodiment 23, wherein the plurality of secondary fibers have a median fiber diameter of from 15 micrometers to 100 micrometers.
25. The non-woven fibrous web of any one of embodiments 22-24, wherein the plurality of secondary fibers comprise polyetherimide.
26. The non-woven fibrous web of any one of embodiments 22-25, wherein the plurality of secondary fibers comprise a semicrystalline thermoplastic polymer.
27. The non-woven fibrous web of embodiment 26, wherein the semicrystalline thermoplastic polymer comprises polyphenylene sulfide.
28. The non-woven fibrous web of any one of embodiments 22-27, wherein the plurality of secondary fibers comprise non-meltable fibers.
29. The non-woven fibrous web of embodiment 28, wherein the non-meltable fibers comprise carbon fibers or precursors thereof.

30. The non-woven fibrous web of embodiment 29, wherein the carbon fibers or precursors thereof comprise oxidized polyacrylonitrile fibers.
31. The non-woven fibrous web of embodiment 28, wherein the non-meltable fibers comprise rayon fibers.
32. The non-woven fibrous web of any one of embodiments 22-31, wherein the secondary fibers comprise up to 100 wt % of oxidized polyacrylonitrile and up to 20 wt % of polyethylene terephthalate staple fibers.
33. The non-woven fibrous web of any one of embodiments 23-32, wherein the plurality of secondary fibers are from 10 wt % to 90 wt % of the non-woven fibrous web.
34. The non-woven fibrous web of embodiment 33, wherein the plurality of secondary fibers are from 30 wt % to 70 wt % of the non-woven fibrous web.
35. The non-woven fibrous web of embodiment 34, wherein the plurality of secondary fibers are from 35 wt % to 65 wt % of the non-woven fibrous web.
36. The non-woven fibrous web of any one of embodiments 1-35, wherein the non-woven fibrous web has a bulk density of from 1 kg/m$^3$ to 1000 kg/m$^3$.
37. The non-woven fibrous web of embodiment 36, wherein the non-woven fibrous web has a bulk density of from 1 kg/m$^3$ to 100 kg/m$^3$.
38. The non-woven fibrous web of embodiment 37, wherein the non-woven fibrous web has a bulk density of from 1 kg/m$^3$ to 50 kg/m$^3$.
39. The non-woven fibrous web of any one of embodiments 1-38, wherein the non-woven fibrous web is substantially free of any halogenated flame-retardant additive.
40. The non-woven fibrous web of any one of embodiments 1-38, wherein the thermoplastic polymer is further blended with a chlorinated phosphate ester.
41. The non-woven fibrous web of any one of embodiments 1-39, wherein a 20-millimeter thick sample of the non-woven fibrous web is capable of passing one or more flammability tests selected from UL 94 V0, UL94 VTM, and FAR 25.856(a).
42. A non-woven fibrous assembly comprising: the non-woven fibrous web of any one of embodiments 1-41 having opposed first and second major surfaces; and an adhesive layer disposed on one or both of the first and second major surfaces.
43. The non-woven fibrous assembly of embodiment 42, wherein the adhesive layer comprises a flame-retardant polymeric binder.
44. The non-woven fibrous assembly of embodiment 43, wherein the flame-retardant polymeric binder comprises a fluoropolymer.
45. The non-woven fibrous assembly of any one of embodiments 42-44, further comprising an outer layer disposed on the adhesive layer that is flame-retardant.
46. The non-woven fibrous assembly of embodiment 45, wherein the outer layer fully encapsulates the non-woven fibrous web such that no surface of the non-woven fibrous web is exposed.
47. The non-woven fibrous assembly of embodiment 45 or 46, wherein the outer layer comprises a plurality of ceramic fibers.
48. A method of making a non-woven fibrous web comprising: mixing a thermoplastic polymer with a phosphinate and/or polymeric phosphonate to obtain a polymeric blend; forming a plurality of melt-blown fibers by passing a molten stream of the polymeric blend through a plurality of orifices of a melt-blowing die; and collecting at least some of the melt-blown fibers on a collector to obtain the non-woven fibrous web.
49. The method of embodiment 48, wherein the non-woven fibrous web is dimensionally stable and exhibits a Shrinkage after being heated to 150° C. for 60 minutes of less than 15%.
50. The method of embodiment 48 or 49, wherein the phosphinate and/or polymeric phosphonate has reactive end groups.
51. The method of embodiment 50, wherein the reactive end groups comprise phenolic end groups.
52. The method of any one of embodiments 48-51, wherein mixing the thermoplastic polymer with the phosphinate and/or polymeric phosphonate reduces melt viscosity of the polymeric blend relative to that of the thermoplastic polymer alone.
53. The method of embodiment 52, wherein mixing the thermoplastic polymer with the phosphinate and/or polymeric phosphonate reduces median fiber diameter of the plurality of melt-blown fibers relative to that obtained using the thermoplastic polymer alone.
54. The method of embodiment 53, wherein mixing the thermoplastic polymer with the phosphinate and/or polymeric phosphonate results in a median fiber diameter that is at least 10 percent less than would be obtained absent mixing the thermoplastic polymer with the polymeric phosphonate.
55. The method of embodiment 54, wherein mixing the thermoplastic polymer with the phosphinate and/or polymeric phosphonate results in a median fiber diameter that is at least 20 percent less than would be obtained absent mixing the thermoplastic polymer with the polymeric phosphonate.
56. The method of embodiment 55, wherein mixing the thermoplastic polymer with the phosphinate and/or polymeric phosphonate results in a median fiber diameter that is at least 30 percent less than would be obtained absent mixing the thermoplastic polymer with the polymeric phosphonate.
57. The method of any one of embodiments 48-56, wherein the plurality of melt-blown fibers has a median fiber diameter in the range from 0.2 micrometers to 20 micrometers.
58. The method of embodiment 57, wherein the plurality of melt-blown fibers has a median fiber diameter in the range from 0.5 micrometers to 15 micrometers.
59. The method of embodiment 58, wherein the plurality of melt-blown fibers has a median fiber diameter in the range from 1 micrometers to 10 micrometers.
60. The method of any one of embodiments 48-59, wherein the thermoplastic polymer comprises a polyester.
61. The method of embodiment 60, wherein the polyester comprises polyethylene terephthalate.

EXAMPLES

Objects and advantages of this disclosure are further illustrated by the following non-limiting examples, but the particular materials and amounts thereof recited in these examples, as well as other conditions and details, should not be construed to unduly limit this disclosure.

Unless otherwise noted, all parts, percentages, ratios, etc. in the Examples and the rest of the specification are by weight.

TABLE 1

Materials

| Designation | Description | Source |
|---|---|---|
| PET | 0.53 intrinsic viscosity (IV) polyethylene terephthalate (PET) available under the trade designation "N211" | Nan Ya Plastics Corporation USA, Wharton, TX. USA. |
| FR PET Scrim | A flame-retardant polyethylene terephthalate (PET) and Rayon scrim with a heat activated adhesive on one side, 50 gsm | Precision Fabrics Group, Inc., Greensboro, NC. USA |
| OPAN | Oxidized polyacrylonitrile staple fibers, 1.7 dTex available under the trade designation "OX" | ZOLTEK Corporation (wholly owned subsidiary of Toray Group), Bridgeton, MO. USA |
| PPS Staple Fibers | Crimped PPS staple fibers available under the designation T-811 | Fiber Innovation Technology, Inc. of Johnson City, TN. USA |
| T270 | A flame-retardant polyethylene terephthalate staple fiber, 6.5 dTex, available under the trade designation "TREVIRA ® 270" | Trevira GmbH, Hattersheim, Germany. |
| PPS | Polyphenylene sulfide resin pellets fibers available under the trade designation "FORTRON 0203" | Celanese of Dallas, TX. USA |
| ULTEM | Thermoplastic polyetherimide available under the trade designation "ULTEM" | Plastics International of Eden Prairie, MN. USA |
| HM1100 | Phosphorous-based transparent high melt flow flame resistant homopolymer available under the trade designation NOFIA HM1100" | FRX Polymers, Inc of Chelmsford, MA. USA |
| OL3001 | Phosphorous-based transparent high melt flow flame resistant polymer with phenolic end groups available under the trade designation "NOFIA OL3001" | FRX Polymers, Inc of Chelmsford, MA. USA |
| OL5000 | Phosphorous based transparent high melt flow flame resistant polymer with phenolic end groups available under the trade designation "NOFIA OL5000" | FRX Polymers, Inc of Chelmsford, MA. USA |
| OP950 | Organic zinc phosphinate available under the trade designation "EXOLIT OP 950" | Clariant of Charlotte, NC. USA |

Test Methods

Median Fiber Diameter: The median fiber diameter of the melt-blown fibers in the nonwoven fibrous webs of the Examples was measured using scanning electron microscopy (SEM). A fiber sample size of at least 200 fibers was used.

Acoustic Absorption: The method of ASTM E1050 was followed.

Nonwoven Web Thickness Measurement: The method of ASTM D5736-95 was followed, according to test method for thickness of high loft nonwoven fabrics. The plate pressure was calibrated at 0.002 psi (13.790 Pascal).

UL94-V0 Flame Test: Reference to UL94-V0 standard with flame height 20-mm, bottom edge of the sample 10-mm into the flame and burn twice at 10 seconds each. A flame propagation height under 125-mm (5 inches) was considered a pass.

Radiant Panel: FAR25.856(a) was followed.

Shrinkage Test: The shrinkage properties of the webs were calculated for each web sample using three 10 cm by 10 cm (3.94 in×3.94 in) samples in both the cross direction (CD) and machine direction (MD). The dimensions of each sample were measured before and after their placement in a Fisher Scientific Isotemp Oven at 150° C. (302° F.) for 60 minutes. Shrinkage for each sample was calculated in the CD and MD by Equation (1):

$$\% \text{ Shrinkage} = (L_0 - L/L_0) \times 100\% \tag{1}$$

where $L_0$ is the initial sample length and L is the final sample length. An average value of shrinkage was calculated and reported for each direction.

Webs produced in the following comparative examples and examples were produced by processes and techniques described in the commonly owned PCT Patent Publication No. WO 2015/080913.

Comparative Example 1

Polyethylene terephthalate (PET) thermoplastic polymer melt blown microfibrous webs were produced. The basis weight was 135 gsm±10%. The webs underwent UL94-V0 Flame and Shrinkage testing and the results are represented in Table 2.

Example 1

5 wt % HM1100 (phosphorous content of approximately 10.5 wt % and glass transition temperature of 105° C.) was added to 95 wt % PET to produce a melt blown microfibrous web. The basis weight was 135 gsm±10%. The web underwent UL94-V0 Flame testing and the results are represented in Table 2.

Example 2

10 wt % HM1100 (phosphorous content of approximately 10.5 wt % and glass transition temperature of 105° C.) was added to 90 wt % PET to produce a melt blown microfibrous web. The basis weight was 135 gsm±10%. The web underwent UL94-V0 Flame and Shrinkage testing and the results are represented in Table 2.

Example 3

15 wt % HM1100 (phosphorous content of approximately 10.5 wt % and glass transition temperature of 105° C.) was added to 85 wt % PET to produce a melt blown microfibrous web. The basis weight was 135 gsm±10%. The web underwent UL94-V0 Flame and Shrinkage testing and the results are represented in Table 2.

Example 4

5 wt % OP950 (phosphorous content of approximately 20 wt % and glass transition temperature of 200° C.) was added to 95 wt % PET to produce a melt blown microfibrous web. The basis weight was 135 gsm±10%. The web underwent UL94-V0 Flame testing and the results are represented in Table 2.

Example 5

10 wt % OP950 (phosphorous content of approximately 20 wt % and glass transition temperature of 200° C.) was added to 90 wt % PET to produce a melt blown microfibrous web. The basis weight was 135 gsm±10%. The web underwent UL94-V0 Flame and Shrinkage testing and the results are represented in Table 2.

Example 6

15 wt % OP950 (phosphorous content of approximately 20 wt % and glass transition temperature of 200° C.) was added to 85 wt % PET to produce a melt blown microfibrous web. The basis weight was 135 gsm±10%. The web underwent UL94-V0 Flame and Shrinkage testing and the results are represented in Table 2.

Example 7

5 wt % OL3001 (phosphorous content of approximately 10 wt % and glass transition temperature of 85° C.) was added to 95 wt % PET to produce a melt blown microfibrous web. The basis weight was 135 gsm±10%. The web underwent UL94-V0 Flame testing and the results are represented in Table 2.

Example 8

10 wt % OL3001 (phosphorous content of approximately 10 wt % and glass transition temperature of 85° C.) was added to 90 wt % PET to produce a melt blown microfibrous web. The basis weight was 135 gsm±10%. The web underwent UL94-V0 Flame and Shrinkage testing and the results are represented in Table 2.

Example 9

15 wt % OL3001 (phosphorous content of approximately 10 wt % and glass transition temperature of 85° C.) was added to 85 wt % PET to produce a melt blown microfibrous web. The basis weight was 135 gsm±10%. The web underwent UL94-V0 Flame, Radiant Panel, and Shrinkage testing and the results are represented in Table 2.

Example 10

5% (weight percent) OL5000 (phosphorous content of approximately 10.3 wt % and glass transition temperature of 88° C.) was added to 95 wt % PET to produce a melt blown microfibrous web. The basis weight was 135 gsm±10%. The web underwent UL94-V0 Flame and Radiant Panel testing and the results are represented in Table 2.

Example 11

10% (weight percent) OL5000 (phosphorous content of approximately 10.3 wt % and glass transition temperature of 88° C.) was added to 90 wt % PET to produce a melt blown microfibrous web. The basis weight was 135 gsm±10%. The web underwent UL94-V0 Flame, Radiant Panel, and Shrinkage testing and the results are represented in Table 2.

Example 12

15% (weight percent) OL5000 (phosphorous content of approximately 10.3 wt % and glass transition temperature of 88° C.) was added to 85 wt % PET to produce a melt blown microfibrous web. The basis weight was 135 gsm±10%. The web underwent UL94-V0 Flame, Radiant Panel, and Shrinkage testing and the results are represented in Table 2.

Comparative Example 2

A blend of PET and PPS produced a melt blown microfibrous web. The weight blending ratio of PET and PPS was 13:7. The basis weight was 135 gsm±10%. The web underwent UL94-V0 Flame and Radiant Panel testing and the results are represented in Table 2.

Comparative Example 3

A blend of PET and ULTEM produced a melt blown microfibrous web. The weight blending ratio of PET and ULTEM was 13:7. The basis weight was 135 gsm±10%. The web underwent UL94-V0 Flame and Radiant Panel testing and the results are represented in Table 2.

Example 13

10 wt % HM1100 (phosphorous content of approximately 10.5 wt % and glass transition temperature of 105° C.) was added to a blend of PET and ULTEM to produce a melt blown microfibrous web. The weight blending ratio of PET and ULTEM was 13:7. The basis weight was 135 gsm±10%. The web underwent UL94-V0 Flame and Radiant Panel testing and the results are represented in Table 2.

Example 14

Step 1: PET pellets were blended with HM1100 additives through hopper feeding into a melt extruder. An extrusion pressure of 177 psi (1.22 MPa) was applied by the melt extruder to produce a melt extrusion rate of 9.08 kg/hour (20 pounds/hour). A 50.8 cm (20 inch) wide melt blowing die of conventional film fibrillation configuration was set up, driven by a melt extruder of conventional type operated at a temperature of 320° C. (608° F.). The die possessed orifices each 0.038 cm (0.015 inch) in diameter.

Step 2: In-flight air quench heated to 315° C. (600° F.) was generally directed onto the extruded as described in commonly owned U.S. Patent Publication No. 2016/0298266 (Ziling et al.). The heated fibers were directed towards a drum collector. Between the heated air ports and the drum collector, crimped ULTEM staple fibers were dispensed into the melt-blown fibers. The crimped staple fibers were approximately 25 microns in diameter and 50 mm long. Sufficient staple fibers were dispensed to constitute 35% by weight of the final fabric. The surface speed of the drum collector was 1.83 m/min (6 feet/minute), so that the basis weight of the collected fabric was 350 gsm. The melt-blown fabric was removed from the drum collector and wound around a core at a wind-up stand. The web underwent UL94-V0 Flame, Radiant Panel, and Shrinkage testing and the results are represented in Table 2.

Example 15

10 wt % HM1100 (phosphorous content of approximately 10.5 wt % and glass transition temperature of 105° C.) was added to a blend of PET and PPS to produce a melt blown microfibrous web. The weight blending ratio of PET and PPS was 13:7. The basis weight was 135 gsm±10%. The web underwent UL94-V0 Flame, Radiant Panel, and Shrinkage testing and the results are represented in Table 2.

Example 16

10 wt % (weight percent) OP950 (phosphorous content of approximately 20% and glass transition temperature of 200° C.) was added to a blend of PET and PPS to produce a melt blown microfibrous web. The weight blending ratio of PET and PPS was 13:7. The basis weight was 135 gsm±10%. The web underwent UL94-V0 Flame, Radiant Panel, and Shrinkage testing and the results are represented in Table 2.

Comparative Example 4

Step 1: OPAN and T270 were blended together to produce a web. The weight blending ratio of OPAN and T270 was 9:1. The basis weight was 130 gsm. The web was folded upon itself (changing basis weight to 260 gsm) and was then conveyed to a Dilo Needle Loom, Model DI-Loom OD-1 6 from Eberbach, Germany having a needleboard array of 23 rows of 75 needles/row where the rows are slightly offset to randomize the pattern. The needles were Foster 20 3-22-1.5B needles. The array was roughly 17.8 cm (7 inches) deep in the machine direction and nominally 61 cm (24 inches) wide with needle spacings of roughly 7.6-mm (0.30 inch). The needleboard was operated at 91 strokes/minute to entangle and compact the web to a roughly 5.1-mm (0.20 inch) thickness.
Step 2: 40 wt % of the OPAN and T270 web created in Step 1 were combined with 60 wt % of PET to produce a melt blown microfibrous web. The basis weight was 150. The web underwent UL94-V0 Flame testing and the result is represented in Table 2.

Example 17

Step 1: OPAN and T270 were blended together to produce a web. The weight blending ratio of OPAN and T270 was 9:1. The basis weight was 130 gsm. The web was folded upon itself (changing basis weight to 260 gsm) and was then conveyed to a Dilo Needle Loom, Model DI-Loom OD-1 6 from Eberbach, Germany having a needleboard array of 23 rows of 75 needles/row where the rows are slightly offset to randomize the pattern. The needles were Foster 20 3-22-1.5B needles. The array was roughly 17.8 cm (7 inches) deep in the machine direction and nominally 61 cm (24 inches) wide with needle spacings of roughly 7.6-mm (0.30 inch). The needleboard was operated at 91 strokes/minute to entangle and compact the web to a roughly 5.1-mm (0.20 inch) thickness.
Step 2: 80 wt % of a 1:4 blend of HM1100 (phosphorous content of approximately 10.5% and glass transition temperature of 105° C.) and PET were added to 20 wt % of the web produced in Step 1 to produce a melt blown microfibrous web. The basis weight was 160 gsm and the web thickness was 3.6 mm. The web underwent UL94-V0 Flame and Shrinkage testing and the results are represented in Table 2.

Example 18

A FR PET Scrim was placed on the top and bottom of the web created in Example 17. The web underwent UL94-V0 Flame testing and the result is represented in Table 2.

Example 19

Step 1: PET pellets were blended with OL3001 additives through hopper feeding into a melt extruder. An extrusion pressure of 1.22 MPa (177 psi) was applied by the melt extruder to produce a melt extrusion rate of 9.08 kg/hour (20 pounds/hour). A 50.8 cm (20 inch) wide melt blowing die of conventional film fibrillation configuration was set up, driven by a melt extruder of conventional type operated at a temperature of 320° C. (608° F.). The die possessed orifices each 0.038 cm (0.015 inch) in diameter.
Step 2: In-flight air quench heated to 315° C. (600° F.) was generally directed onto the extruded as described in commonly owned U.S. Patent Publication No. 2016/0298266 (Ziling et al.). The heated fibers were directed towards a drum collector. Between the heated air ports and the drum collector, crimped PPS staple fibers were dispensed into the melt-blown fibers. The crimped staple fibers were approximately 20 microns in diameter and 38 mm long. Sufficient staple fibers were dispensed to constitute 50% by weight of the final fabric. The surface speed of the drum collector was 1.83 m/min (6 feet/minute), so that the basis weight of the collected fabric was 350 gsm. The melt-blown fabric was removed from the drum collector and wound around a core at a wind-up stand. The acoustic absorption performance of the web was tested and the result is represented in Table 3. Then, the web underwent UL94-V0 Flame, Radiant Panel, and Shrinkage testing and the results are represented in Table 2.

Example 20

Step 1: PET pellets were blended with OP950 additives through hopper feeding into a melt extruder. An extrusion pressure of 177 psi (1.22 MPa) was applied by the melt extruder to produce a melt extrusion rate of 9.08 kg/hour (20 pounds/hour). A 50.8 cm (20 inch) wide melt blowing die of conventional film fibrillation configuration was set up, driven by a melt extruder of conventional type operated at a temperature of 320° C. (608° F.). The die possessed orifices each 0.038 cm (0.015 inch) in diameter.
Step 2: In-flight air quench heated to 315° C. (600° F.) was generally directed onto the extruded as described in commonly owned U.S. Patent Publication No. 2016/0298266 (Zillig et al.). The heated fibers were directed towards a drum collector. Between the heated air ports and the drum collector, crimped PPS staple fibers were dispensed into the melt-blown fibers. The crimped staple fibers were approximately 20 microns in diameter and 38 mm long. Sufficient staple fibers were dispensed to constitute 50% by weight of the final fabric. The surface speed of the drum collector was 1.83 m/min (6 feet/minute), so that the basis weight of the collected fabric was 350 gsm. The melt-blown fabric was removed from the drum collector and wound around a core at a wind-up stand. The acoustic absorption performance of the web was tested and the result is represented in Table 3. Then, the web underwent UL94-V0 Flame, Radiant Panel, and Shrinkage testing and the results are represented in Table 2.

TABLE 2

UL94-V0 Flame and Radiant Panel Test Results

| | Median | | | 150° C. for 60 Minutes | |
|---|---|---|---|---|---|
| Example | Fiber Diameter (microns) | UL94-V0 Flame Test | Radiant Panel Test | Average CD Shrinkage (%) | Average MD Shrinkage (%) |
| CE1 | 3.2 | Fail | N/A | 13.3 | 9.3 |
| EX1 | 4.5 | Pass - VTM0 | N/A | N/A | N/A |
| EX2 | 6.8 | Pass - VTM0 | N/A | 9.3 | 11.4 |
| EX3 | 7.6 | Pass - VTM0 | N/A | 9.4 | 11.7 |
| EX4 | 6.2 | Pass - VTM0 | N/A | N/A | N/A |
| EX5 | 9.4 | Pass - VTM0 | N/A | 8.7 | 9.3 |
| EX6 | 15 | Pass - VTM0 | N/A | 10.7 | 11.3 |
| EX7 | 2.5 | Pass - VTM0 | N/A | N/A | N/A |
| EX8 | 5.2 | Pass - VTM0 | N/A | 7.3 | 9.3 |
| EX9 | 4.8 | Pass - VTM0 | Pass | 11.7 | 7.3 |
| EX10 | 7.4 | Fail | Pass | N/A | N/A |
| EX11 | 6.8 | Pass - VTM0 | Pass | 8.7 | 11.3 |
| EX12 | 6.8 | Pass - V0 | Pass | 10.7 | 11.3 |
| CE2 | 7.3 | Fail | Fail | N/A | N/A |
| CE3 | 7.3 | Fail | Fail | N/A | N/A |
| EX13 | 7.1 | Pass - V0 | Pass | N/A | N/A |
| EX14 | 4.5 | Pass - V0 | Pass | 5.0 | 6.0 |
| EX15 | 7.1 | Pass - V0 | Pass | 5.0 | 5.0 |
| EX16 | 7.6 | Pass - V0 | Fail | 5.0 | 5.0 |
| CE4 | 7.0 | Pass - V0 | N/A | N/A | N/A |
| EX17 | 7.0 | Pass - V0 | N/A | 7.3 | 6.0 |
| EX18 | 7.0 | Pass - V0 | N/A | N/A | N/A |
| EX19 | 2.5 | Pass - V0 | Pass | 5.0 | 6.3 |
| EX20 | 9.4 | Fail | Fail | 7.3 | 6.0 |

TABLE 3

Acoustic Absorption Test Results

| Frequency | Sound Absorption Coefficient | |
|---|---|---|
| (Hz) | EX19 | EX20 |
| 0 | 0.000 | 0.000 |
| 500 | 0.053 | 0.308 |
| 1000 | 0.111 | 0.691 |
| 1500 | 0.187 | 0.934 |
| 2000 | 0.239 | 0.973 |
| 2500 | 0.312 | 0.961 |
| 3000 | 0.406 | 0.917 |
| 4000 | 0.5113 | 0.890 |
| 5000 | 0.619 | 0.934 |
| 6000 | 0.743 | 0.956 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A non-woven fibrous web comprising:
a plurality of melt-blown fibers comprising a thermoplastic polymer blended with a polymeric phosphonate to provide a chemically-compatible polymeric blend characterized by a single uniform phase, the thermoplastic polymer comprising polyethylene terephthalate and the polymeric phosphonate being a polymeric phosphonate homopolymer containing one or more phenolic end groups and having a glass transition temperature of from 80° C. to 100° C., and
a plurality of secondary fibers having a median fiber diameter of from 10 micrometers to 50 micrometers, the secondary fibers comprised of polyphenylene sulfide,
wherein the nonwoven fibrous structure exhibits a Shrinkage of less than 15% after being heated to 150° C. for 60 minutes.

2. The non-woven fibrous web of claim 1, wherein the polymeric phosphonate is consisting of the polymeric phosphonate homopolymer.

3. The non-woven fibrous web of claim 1, wherein the polymeric phosphonate has a phosphorus content in the range from 1 wt % to 50 wt % based on the overall weight of the polymeric phosphonate.

4. The non-woven fibrous web of claim 1, wherein the polymeric phosphonate has a number average molecular weight in the range from 100 g/mol to 10000 g/mol.

5. The non-woven fibrous web of claim 1, wherein the polymeric phosphonate is present in an amount ranging from 5 wt % to 50 wt % based on the overall weight of the plurality of melt-blown fibers.

6. The non-woven fibrous web of claim 1, wherein the plurality of melt-blown fibers has a median fiber diameter in the range from 0.2 micrometers to 20 micrometers.

7. The non-woven fibrous web of claim 1, further comprising a plurality of secondary fibers having a median fiber diameter of from 8 micrometers to 1000 micrometers.

8. The non-woven fibrous web of claim 7, wherein the plurality of secondary fibers comprise a semicrystalline thermoplastic polymer.

9. The non-woven fibrous web of claim 7, wherein the plurality of secondary fibers comprise non-meltable fibers.

10. The non-woven fibrous web of claim 9, wherein the non-meltable fibers comprise oxidized polyacrylonitrile fibers.

11. The non-woven fibrous web of claim 1, wherein a 20-millimeter thick sample of the non-woven fibrous web is capable of passing one or more flammability tests selected from UL 94 V0, UL94 VTM, and FAR 25.856 (a).

12. A non-woven fibrous assembly comprising:
the non-woven fibrous web of claim 1 having opposed first and second major surfaces; and
an adhesive layer disposed on one or both of the first and second major surfaces.

13. The non-woven fibrous assembly of claim 12, wherein the adhesive layer comprises a flame-retardant polymeric binder, the flame-retardant polymeric binder optionally comprising a fluoropolymer.

14. The non-woven fibrous assembly of claim 13, further comprising an outer layer disposed on the adhesive layer that is flame-retardant.

15. A method of making a non-woven fibrous web comprising:
mixing a thermoplastic polymer comprising polyethylene terephthalate with a polymeric phosphonate to obtain a chemically-compatible polymeric blend that has a melt viscosity that is reduced relative to that of the thermoplastic polymer alone, the polymeric phosphonate being a polymeric phosphonate homopolymer containing one or more phenolic end groups and having a glass transition temperature of from 80° C. to 100° C.;
forming a plurality of melt-blown fibers by passing a molten stream of the polymeric blend through a plurality of orifices of a melt-blowing die, wherein the chemically-compatible polymeric blend is characterized by a single uniform phase during the forming of the melt blown fibers;

mixing into the molten stream of the polymeric blend a plurality of secondary fibers having a median fiber diameter of from 10 micrometers to 50 micrometers, the secondary fibers comprised of polyetherimide or polyphenylene sulfide; and collecting at least some of the melt-blown fibers on a collector to obtain the non-woven fibrous web.

16. The method of claim 15, wherein the non-woven fibrous web is dimensionally stable and exhibits a Shrinkage after being heated to 150° C. for 60 minutes of less than 15%.

17. The method of claim 15, wherein mixing the thermoplastic polymer with the polymeric phosphonate reduces median fiber diameter of the plurality of melt-blown fibers relative to that obtained using the thermoplastic polymer alone.

18. The non-woven fibrous web of claim 1, wherein the phenolic end groups of the polymeric phosphonate homopolymer are not reactive with the thermoplastic polymer.

19. The method of claim 15, wherein the phenolic end groups of the polymeric phosphonate homopolymer are not reactive with the thermoplastic polymer.

* * * * *